United States Patent
Karube

(10) Patent No.: US 12,530,761 B2
(45) Date of Patent: Jan. 20, 2026

(54) FEATURE QUANTITY SELECTION METHOD AND DEVICE

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 18/187,775

(22) Filed: Mar. 22, 2023

(65) Prior Publication Data

US 2023/0316494 A1     Oct. 5, 2023

(30) Foreign Application Priority Data

Mar. 29, 2022    (JP) ................................ 2022-053352

(51) Int. Cl.
     *G06T 7/00*           (2017.01)
     *G06V 10/20*         (2022.01)
     (Continued)

(52) U.S. Cl.
     CPC .......... *G06T 7/0006* (2013.01); *G06V 10/255* (2022.01); *G06V 10/764* (2022.01);
     (Continued)

(58) Field of Classification Search
     CPC ......... G06T 7/0006; G06T 2207/20076; G06T 2207/30164; G06T 7/0004;
     (Continued)

(56) References Cited

U.S. PATENT DOCUMENTS

| | | | | |
|---|---|---|---|---|
| 2012/0229618 A1* | 9/2012 | Urano | ................... | G06T 7/0004 |
| | | | | 348/92 |
| 2015/0369752 A1* | 12/2015 | Honda | ............... | G01N 21/9501 |
| | | | | 356/237.2 |

(Continued)

FOREIGN PATENT DOCUMENTS

| | | |
|---|---|---|
| CN | 107004265 A | 8/2017 |
| CN | 113646786 A | 11/2021 |

(Continued)

OTHER PUBLICATIONS

Chinese Office Action issued by the China National Intellectual Property Administration on Jul. 30, 2025 in corresponding CN Patent Application No. 202310311119.X, with English translation.

*Primary Examiner* — Jennifer Mehmood
*Assistant Examiner* — Vaisali Rao Koppolu
(74) *Attorney, Agent, or Firm* — Carter, DeLuca & Farrell LLP

(57) ABSTRACT

A feature quantity selection method according to the present invention includes extracting a multidimensional feature quantity from expert data including images of various defect shapes, extracting a multidimensional feature quantity from non-expert data including images of limited defect shapes, calculating a standard deviation in every dimension of the respective feature quantities of the expert data and the non-expert data that have been extracted; calculating a ratio between the standard deviation in every dimension of the calculated expert data and the standard deviation in every dimension of the calculated non-expert data, selecting a predetermined number of standard deviation ratios in descending order of value from among the standard deviation ratios that have been calculated, and selecting feature quantities associated with the standard deviation ratios that (Continued)

have been selected, as the feature quantities each having a high contribution degree to a specific defect mode.

6 Claims, 4 Drawing Sheets

(51) Int. Cl.
 *G06V 10/764* (2022.01)
 *G06V 10/77* (2022.01)
 *G06V 10/774* (2022.01)
(52) U.S. Cl.
 CPC ........ *G06V 10/7715* (2022.01); *G06V 10/774* (2022.01); *G06T 2207/20076* (2013.01); *G06T 2207/30164* (2013.01)
(58) Field of Classification Search
 CPC . G06T 2207/20084; G06T 2207/20081; G06T 2207/30108; G06V 10/255; G06V 10/764; G06V 10/7715; G06V 10/774; G06V 10/454; G06V 10/462; G06V 2201/06; G06V 10/44; G06V 10/82; G06F 18/2433; G06N 3/0455; G06N 3/0464; G06N 3/0475; G06N 3/08; G06N 3/094
 See application file for complete search history.

(56) References Cited

U.S. PATENT DOCUMENTS

| | | |
|---|---|---|
| 2017/0330315 A1 | 11/2017 | Okuda |
| 2022/0044152 A1 | 2/2022 | Masuzaki |
| 2022/0375067 A1* | 11/2022 | Osunkwo .............. G06T 7/0004 |

FOREIGN PATENT DOCUMENTS

| | | | |
|---|---|---|---|
| JP | 2009032273 A | | 2/2009 |
| JP | 2009110064 A | * | 5/2009 |
| JP | 2016-109495 A | | 6/2016 |
| JP | 2018205860 A | * | 12/2018 |

* cited by examiner

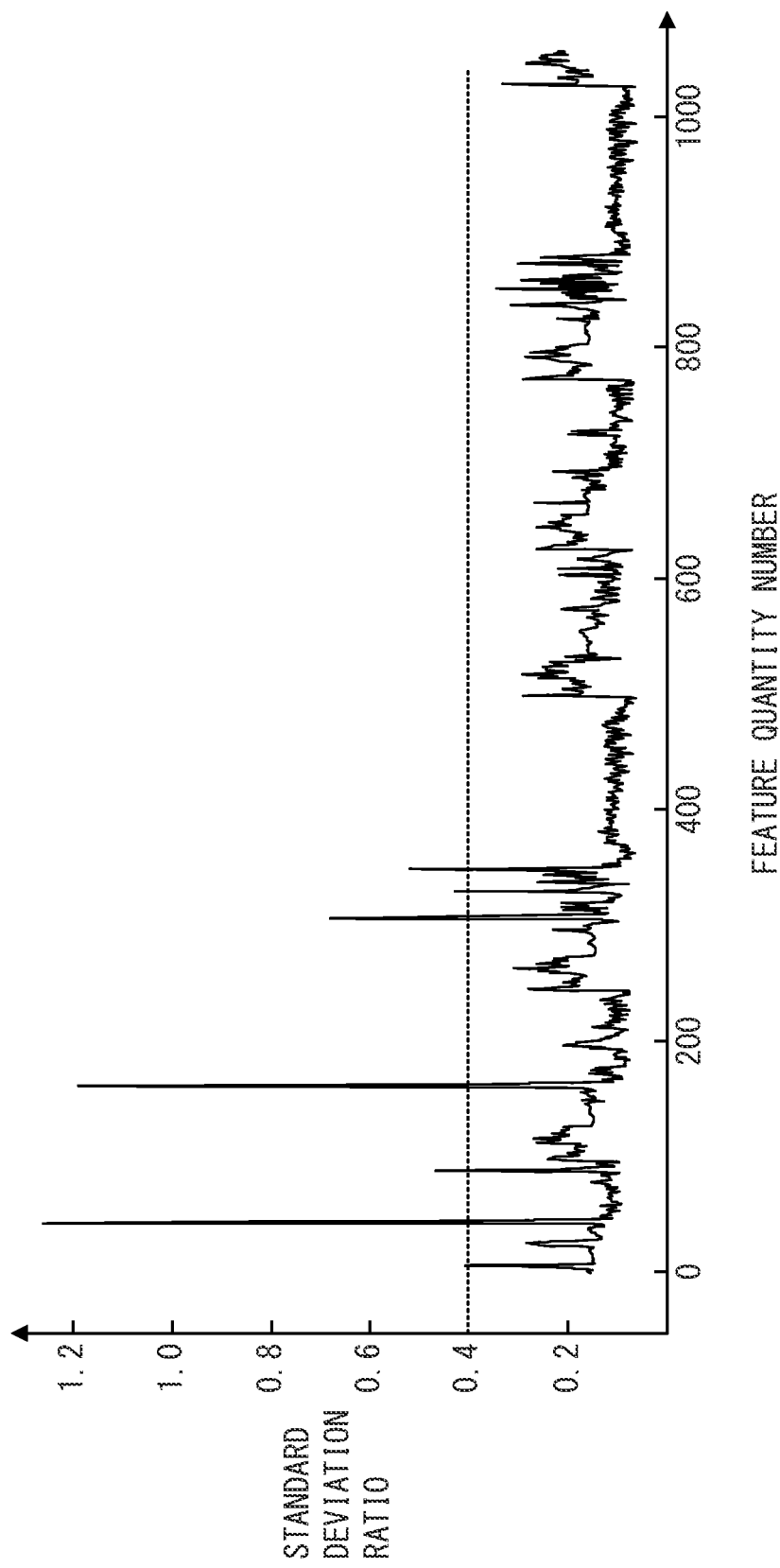

FEATURE QUANTITY SELECTION METHOD AND DEVICE

BACKGROUND

Technical Field

The present invention relates to a feature quantity selection method and a feature quantity selection device in a learning model to be applied to an inspection device or the like having a machine learning function that uses a neural network so as to determine the quality of an inspected object.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In such an inspection device, learning is performed by reading, as teacher data, many pieces of image data of appearances of the inspected objects that have been classified as the non-defective products and the defective products. Then, the inspection device that has learned classification criteria becomes capable of classifying a new inspected object that has been imaged by a camera as a non-defective product or a defective product.

In the learning by a classification model in such an inspection device, a technique such as scale-invariant feature transform (SIFT) or convolutional neural network (CNN) is used for extracting a feature quantity from an image of teacher data. By finding a pattern or a consistency common to normal products or abnormal products, it becomes possible to classify the object as the normal product or the abnormal product with accuracy.

In considering a case where an image of an abnormal product is used as teacher data and a classification model is caused to learn shapes of various defects, there are several types of defects (defect modes) depending on the characteristic of a product or its manufacturing method, for example, in the case of a cast product, there are a shrinkage cavity, a scratch, a dent, and the like. The shape of the defect usually differs largely in every defect mode. Hence, in a case where the feature quantity is extracted from the teacher data of the abnormal product, understanding of a feature quantity specific to every defect mode is useful for constructing a classification model with high accuracy, in some cases.

In addition, in terms of collecting images of the abnormal products, conceivable cases include a case of collecting data selected by an expert such as a skilled person or an operator with long years of experience (hereinafter, referred to as "expert data") and a case of collecting data selected by a non-expert such as a newcomer or an operator with short years of experience (hereinafter, referred to as "non-expert data"). There are drawbacks that, in the former case, in trying to obtain a sufficient quantity of teacher data by using the expert data only, a skilled person needs to be on duty for long hours, and thus efficiency in terms of cost is not good, and in the latter case, the types and shapes of abnormal products that can be acquired tend to be average ones, and in a case of using the non-expert data only as the teacher data, it is not possible to accurately classify an abnormal product that is low in occurrence probability. For this reason, by combining minimum expert data and easily collectable non-expert data, it is important to collect teacher data that ensures the quality, while suppressing the cost.

A random forest, which is one type of ensemble learning, has been conventionally known as a method for calculating an importance degree (contribution degree) of an explanatory variable (feature quantity) in a classification model. In the learning by the classification model in an inspection device, for example, the one described in JP 2016-109495 A is known for selecting a feature quantity having a high contribution degree by use of the random forest.

In JP 2016-109495 A, a temporary classifier is generated by use of the random forest having a plurality of feature quantities as explanatory variables, based on a plurality of pieces of learning data that have been prepared beforehand, and a feature quantity having a low contribution degree to the classification with such a temporary classifier is identified. Next, a new temporary classifier is generated by use of the random forest again, based on a plurality of pieces of learning data excluding the feature quantity having the low contribution degree, and is compared with the previously generated temporary classifier with regard to a correct answer rate in the classification. By repeating such a procedure a plurality of times, a classifier that has used only a feature quantity having a high contribution degree to the classification is generated finally.

SUMMARY

With the random forest, however, in order to accurately extract a feature quantity having a high contribution degree in the classification model, it is necessary to prepare sufficient quality and amount of teacher data beforehand. Even though the feature quantity having the high contribution degree is extracted by use of the random forest at a stage where sufficient learning data is not prepared, there is a high possibility that such a feature quantity does not have a high contribution degree in the classification model with high accuracy.

Therefore, for example, in a situation in which sufficient teacher data is not obtained like a manufacturing line at an operation initial stage, in order to construct a classification model with high accuracy efficiently, in a case where it is necessary to extract a feature quantity having a large influence on every defect mode, it is not possible to extract a feature quantity by using the random forest. Hence, there is a demand for development of a new technique capable of selecting a feature quantity having a high contribution degree in every defect mode from a small number of defective product images at the initial stage of production line startup.

The present invention has been made to address such drawbacks, and has an object to provide a feature quantity selection method capable of selecting a feature quantity having a high contribution degree in every defect mode, by using minimum expert data and a few pieces of non-expert data.

In order to achieve the above object, a feature quantity selection method according to a first aspect of the present invention is a feature quantity selection method for selecting a feature quantity having a high contribution degree to a specific defect mode, based on expert data and non-expert data, the expert data including images of various defect shapes and being classified in every defect mode indicating a type of a defect, the non-expert data including images of limited defect shapes and being classified in the every defect mode, the feature quantity selection method including:

extracting the expert data corresponding to the specific defect mode, and extracting a multidimensional feature quantity from the expert data that has been extracted (step 4 in FIG. 3); extracting the non-expert data corresponding to the specific defect mode, and extracting the multidimensional feature quantity from the non-expert data that has been extracted (step 5 in FIG. 3); calculating a standard deviation in every dimension of the feature quantity of the expert data that has been extracted (step 6 in FIG. 3); calculating a standard deviation in every dimension of the feature quantity of the non-expert data that has been extracted (step 6 in FIG. 3); calculating, as a standard deviation ratio, a ratio between the standard deviation in the every dimension of the feature quantity of the expert data that has been calculated and the standard deviation in the every dimension of the feature quantity of the non-expert data that has been calculated (step 7 in FIG. 3); and selecting a predetermined number of standard deviation ratios in descending order of value from among the standard deviation ratios that have been calculated, and selecting feature quantities associated with the standard deviation ratios that have been selected, as the feature quantities each having the high contribution degree to the specific defect mode (step 9 in FIG. 3).

In such a feature quantity selection method, data corresponding to a desired defect mode is extracted from a few pieces of expert data, a multidimensional feature quantity is extracted from such data, and a standard deviation in every dimension is calculated. Here, the expert data is, for example, data that has been selected beforehand by a skilled operator, and is data comprehensively including a wide variety of patterns of defect shapes that can occur in every defect mode. Therefore, feature quantities extracted therefrom tend to be in a distribution state evenly spreading out as a whole, and the standard deviation tends to be large.

On the other hand, the non-expert data is, for example, data to be selected on a manufacturing line by an inexperienced operator and to be sequentially accumulated, and is assumed to include many pieces of data, in which corresponding defect shapes are unclear, and which are limited to average defect shapes to be relatively easily detected. Therefore, the feature quantities that have been extracted from relatively a few pieces of non-expert data at a collection initial stage tend to be in a distribution state concentrated in the vicinity of the average value, and the standard deviation tends to be small.

Such tendencies are studied more specifically. For example, in a case of an appearance inspection for a cast product, lightness, a gray scale cycle, position information, or the like can be considered as a feature quantity of the inspected object. However, while defining this for every pixel of the image or for every rectangular area position in image scanning, it is not uncommon that the number of the feature quantities obtained exceeds 1000 dimensions. On the other hand, in general, the feature quantity that is important (high in contribution degree) to accurately classify the defect shape for every type of a plurality of existing defects (defect modes) is limited, and in addition, it is considered to be different in every defect mode.

Here, for example, in a case of a feature quantity having a small contribution degree in a desired defect mode, in both the expert data including various defect shapes and the non-expert data considered to include only an average defect shape, the distribution of the feature quantities to be extracted is narrow, and the difference in standard deviation between them is also small. Therefore, the standard deviation ratio in the dimension of such a feature quantity also has a small value. On the other hand, in a case of a feature quantity having a large contribution degree in the desired defect mode, the distribution of the feature quantities to be extracted is wide, and the standard deviation is large in the expert data including various defect shapes, whereas in the non-expert data including only the average defect shape, the distribution of the feature quantities to be extracted is narrow, and the standard deviation is not so large. Thus, it is considered that the difference in standard deviation between them largely appears. Therefore, the standard deviation ratio in dimension between the feature quantities is considered to be a large value.

On the basis of the above findings, in the present invention, data corresponding to a desired defect mode is extracted from relatively a few pieces of non-expert data that have been collected. From such data, a feature quantity in the same dimension with the feature quantity that has been extracted from the expert data is extracted, and a standard deviation in every dimension is calculated. Then, a ratio in every dimension between the standard deviation of each feature quantity that has been calculated from the expert data and the standard deviation of each feature quantity that has been calculated from the non-expert data is calculated as a standard deviation ratio. Then, a predetermined number of the standard deviation ratios are selected in descending order of value, and the feature quantities associated with the standard deviation ratios that have been selected are selected as the feature quantities each having a high contribution degree to a specific defect mode. Therefore, according to the present invention, it is possible to select a feature quantity having a high contribution degree in every defect mode by using minimum expert data and a few pieces of non-expert data.

According to a second aspect of the present invention, in the feature quantity selection method described in the first aspect, in the selecting, the predetermined number of the standard deviation ratios are selected in the descending order of the value from among the standard deviation ratios that have been calculated and that exceed a predetermined threshold value, and the feature quantities associated with the standard deviation ratios that have been selected are selected as the feature quantities each having the high contribution degree to the specific defect mode.

According to this configuration, from among the standard deviation ratios that have been calculated, only the ratio that exceeds a predetermined threshold value is to be selected, so that a feature quantity having a higher contribution degree to the specific defect mode can be selected. Therefore, it is possible to select the feature quantity having the higher contribution degree in every defect mode by using minimum expert data and a few pieces of non-expert data.

According to a third aspect of the present invention, in the feature quantity selection method described in the first aspect, the defect mode includes at least one of a shrinkage cavity, a scratch, a dent, and a chip residue.

According to this configuration, at least one of the shrinkage cavity, the scratch, the dent, and the chip residue is included as the defect mode. Therefore, in particular, in a defective product image of a cast product, it is possible to select the feature quantity having the high contribution degree in every defect mode by using minimum expert data and a few pieces of non-expert data.

According to a fourth aspect of the present invention, in the feature quantity selection method described in the first aspect, the expert data includes a generated image that has been generated, based on an actual image of a defect shape.

According to this configuration, not only the real image of the defect shape but also the generated image that has been generated by an image generation technique based on the real image are included as the minimum expert data, so that the number of real images obtained by a skilled operator made to be on duty can be further reduced. Accordingly, the cost related to the collection of the expert data can be further reduced.

A feature quantity selection device according to a fifth aspect of the present invention is a feature quantity selection device that selects a feature quantity having a high contribution degree to a specific defect mode, based on expert data and non-expert data, the expert data including images of various defect shapes and being classified in every defect mode indicating a type of a defect, the non-expert data including images of limited defect shapes and being classified in the every defect mode, the feature quantity selection device including: an expert feature quantity extraction unit (feature quantity extraction unit 15 in an embodiment (hereinafter, the same applies in this section)) configured to extract the expert data corresponding to the specific defect mode, and to extract a multidimensional feature quantity from the expert data that has been extracted; a non-expert feature quantity extraction unit (feature quantity extraction unit 15) configured to extract the non-expert data corresponding to the specific defect mode, and to extract the multidimensional feature quantity from the non-expert data that has been extracted; an expert standard deviation calculation unit (standard deviation calculation unit 16) configured to calculate a standard deviation in every dimension of the feature quantity of the expert data that has been extracted; a non-expert standard deviation calculation unit (standard deviation calculation unit 16) configured to calculate a standard deviation in every dimension of the feature quantity of the non-expert data that has been extracted; a standard deviation ratio calculation unit (standard deviation ratio calculation unit 17) configured to calculate, as a standard deviation ratio, a ratio between the standard deviation in the every dimension of the feature quantity of the expert data that has been calculated and the standard deviation in the every dimension of the feature quantity of the non-expert data that has been calculated; and a feature quantity selection unit (feature quantity selection unit 18) configured to select a predetermined number of standard deviation ratios in descending order of value from among the standard deviation ratios that have been calculated, and to select feature quantities associated with the standard deviation ratios that have been selected, as the feature quantities each having the high contribution degree to the specific defect mode.

Such a feature quantity selection device extracts data corresponding to a desired defect mode from a few pieces of expert data, extracts the multidimensional feature quantity from the data, calculates the standard deviation in every dimension, and in addition, extracts data corresponding to the desired defect mode from relatively a few pieces of non-expert data that have been collected, extracts, from such data, the feature quantity in the same dimension with the feature quantity that has been extracted from the expert data, and calculates the standard deviation in every dimension. Then, a ratio in every dimension between the standard deviation that has been calculated from the expert data and the standard deviation that has been calculated from the non-expert data is calculated as the standard deviation ratio. Then, a predetermined number of the standard deviation ratios are selected in descending order of value, and the feature quantities associated with the standard deviation ratios that have been selected are selected as the feature quantities each having a high contribution degree to a specific defect mode. Therefore, according to the present invention, it is possible to select a feature quantity having a high contribution degree in every defect mode by using minimum expert data and a few pieces of non-expert data.

BRIEF DESCRIPTION OF DRAWINGS

FIG. 4 is a diagram for describing feature quantity selection based on a standard deviation ratio in every dimension of a feature quantity.

DETAILED DESCRIPTION

Figure 1:
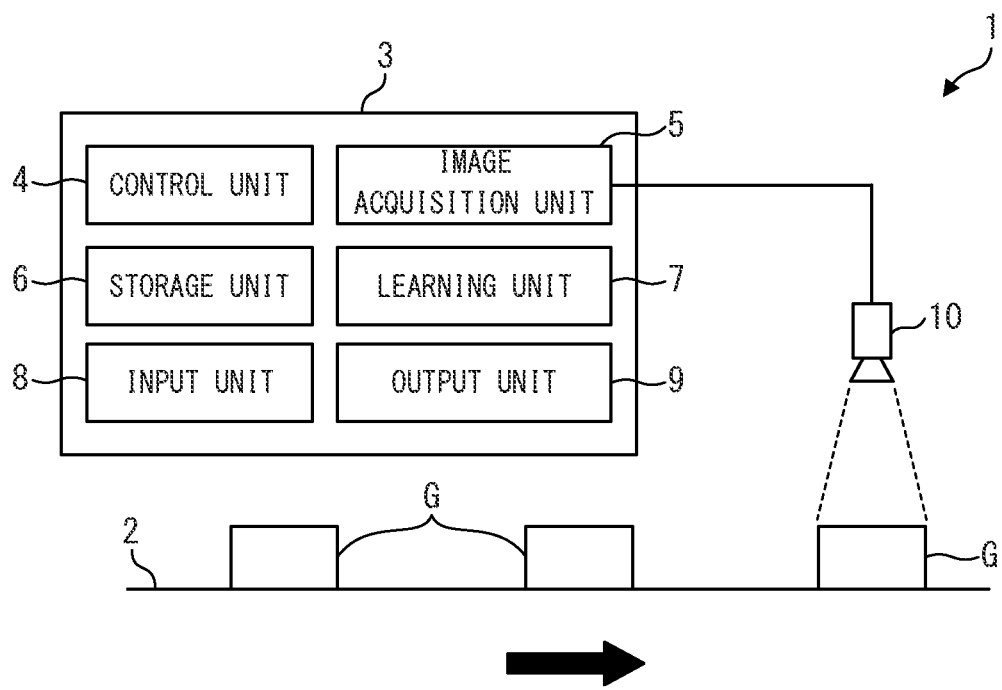
FIG. 1 is a diagram for describing an outline of an inspection system in which teacher data that has been collected, based on a feature quantity that has been selected by a feature quantity selection device according to an embodiment of the present invention, is used for learning.

Hereinafter, preferred embodiments of the present invention will be described in detail with reference to the drawings. FIG. 1 illustrates an inspection system including a classification model by which learning has been performed by use of data of a defective product image (defective product data) that has been collected, based on a feature quantity that has been selected by a feature quantity selection device 11 to be described later, and data of a non-defective product image (non-defective product data). Such an inspection system 1 is installed in, for example, a manufacturing factory of vehicle components, and by inspecting the appearance of a vehicle component, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object G in a predetermined direction at a predetermined speed, and an inspection device 3 for determining the quality of the inspected object G, when the inspected object G reaches a predetermined inspection position. Note that the illustration is omitted, but the inspected object G that has been determined to be a defective product by the inspection device 3 is removed from the conveyor 2, or is conveyed to a storage place dedicated to the defective products.

The inspection device 3 is configured with an information processing device mainly including a computer, and includes a control unit 4, an image acquisition unit 5, a storage unit 6, a learning unit 7, an input unit 8, an output unit 9, and a camera 10.

The control unit 4 includes a CPU, and controls the above respective units 5 to 9 of the inspection device 3, and the camera 10. The image acquisition unit 5 acquires, as digital data, an external appearance image of the inspected object G that has been imaged by the camera 10. The storage unit 6 includes a ROM and a RAM, stores various programs to be used in the control of the inspection device 3, and also stores various types of data. The learning unit 7 includes a learning model by which criteria for determining the quality of the inspected object G have been learned. The input unit 8 includes a keyboard and/or a mouse to be operated by an operator, and in addition, is configured so that data and/or signals can be input from the outside. The output unit 9 includes a display device such as a display on which a determination result of the inspected object G is displayed.

Figure 2:
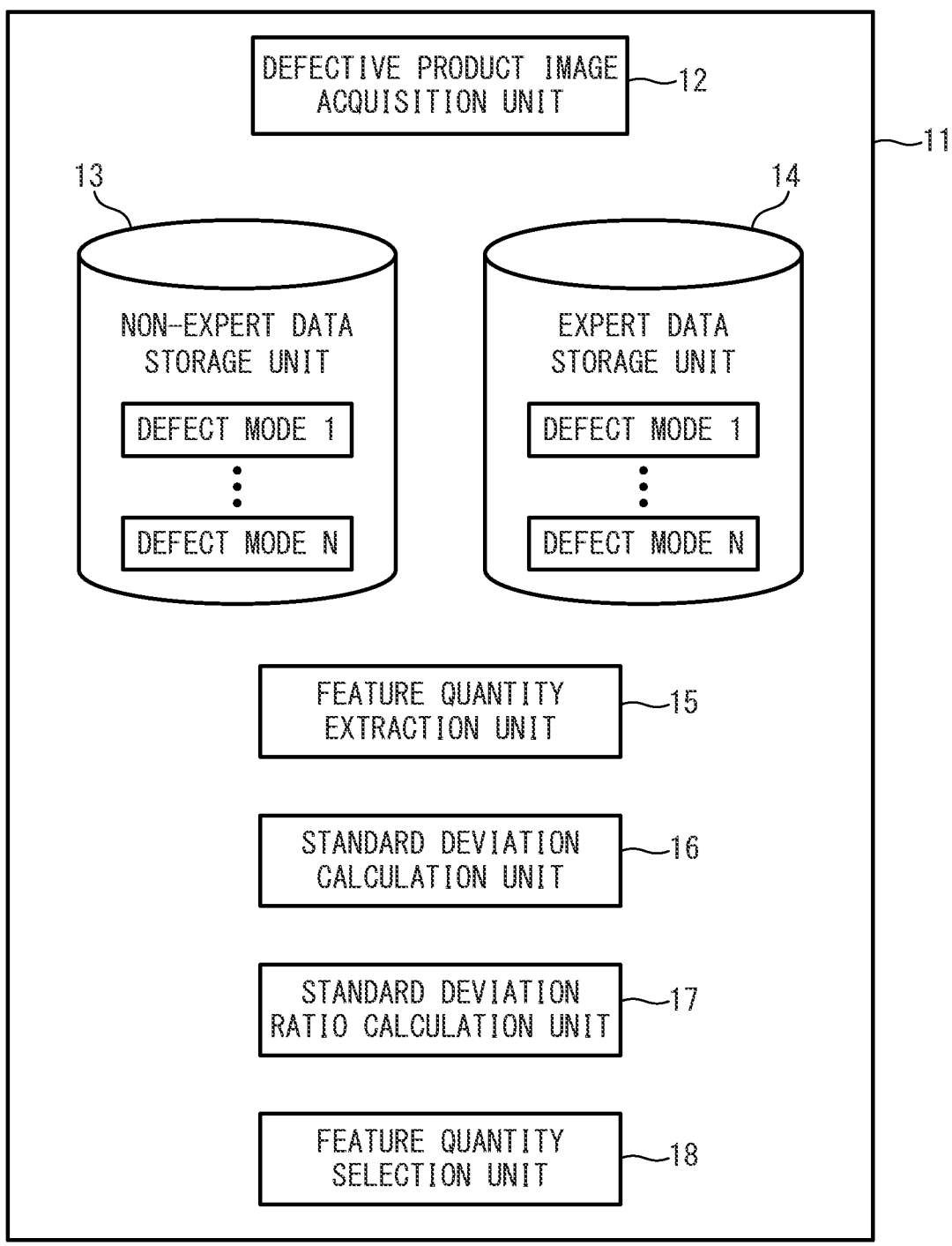
FIG. 2 is a block diagram illustrating the feature quantity selection device according to an embodiment of the present invention.

FIG. 2 illustrates a feature quantity selection device 11 according to an embodiment of the present invention. The feature quantity selection device 11 is operated by an operator who performs an inspection operation of the inspected object G so as to select a feature quantity having a high contribution degree for every defect type (defect mode) in the defective product data. Information of the feature quantity having the high contribution degree that has been selected by the feature quantity selection device 11 is transmitted to a teacher data collection device, not illustrated, so as to improve the efficiency in collecting the teacher data, or is transmitted to the learning unit 7 of the inspection device 3 so as to improve the efficiency in the learning by the classification model.

Similarly to the inspection device 3 described above, the feature quantity selection device 11 is configured with an information processing device including a computer, and includes a defective product image acquisition unit 12, a non-expert data storage unit 13, an expert data storage unit 14, a feature quantity extraction unit 15 (expert feature quantity extraction unit, non-expert feature quantity extraction unit), a standard deviation calculation unit 16 (expert standard deviation calculation unit, non-expert standard deviation calculation unit), a standard deviation ratio calculation unit 17 (standard deviation ratio calculation unit), and a feature quantity selection unit 18 (feature quantity selection unit).

Regarding an external appearance image of the inspected object G that has been imaged by a camera similar to the camera 10 of the inspection device 3 described above, the defective product image acquisition unit 12 acquires, as defective product data, the external appearance image that has been determined to be a defective product by the operator.

The non-expert data storage unit 13 stores defective product data (non-expert data) that has been selected by non-experts (newcomers or operators with short years of experience in the inspection operation). On the other hand, the expert data storage unit 14 stores defective product data (expert data) that has been selected by experts (skilled persons or operators with long years of experience in the inspection operation).

A label indicating a type of a defect (defect mode) that has occurred in the defective product is applied to each piece of defective product data beforehand, and the non-expert data storage unit 13 and the expert data storage unit 14 store each piece of defective product data in a classifiable form for every label. In a case where the inspected object G is a cast product, it is possible to configure such that at least one of a shrinkage cavity, a scratch, a dent, a chip residue, and the like is included as a defect mode. In the present embodiment, as the defect mode, every one of the shrinkage cavity, the scratch, the dent, and the chip residue is configured to be included.

In addition, the non-expert data and the expert data may include actual defective product data that has been respectively selected by the non-expert and the expert, and may additionally include pseudo defective product data that has been generated by use of, for example, a variational auto encoder (VAE) or a generative adversarial network (GAN), based on the actual defective product data.

The feature quantity extraction unit 15 extracts non-expert data and expert data, to each of which a label indicating a desired defect mode that has been selected by an operator is applied, respectively from the non-expert data storage unit 13 and the expert data storage unit 14, and extracts a predetermined feature quantity from each the non-expert data and the expert data that have been selected (expert feature quantity extracting step, non-expert feature quantity extracting step).

For example, in a case of appearance inspection for a cast product, it is possible to extract lightness, a gray scale cycle, position information, or the like, as a feature quantity of the inspected object, for every pixel of an image or for every rectangular area position in image scanning. For extracting such a feature quantity, it is possible to use a known method such as scale-invariant feature transform (SIFT) or convolutional neural network (CNN). In the present embodiment, for example, a 1058-dimensional feature quantity is extracted as a predetermined feature quantity. The respective feature quantities are respectively assigned with feature quantity numbers 1 to 1058 for the sake of convenience.

The standard deviation calculation unit 16 calculates a standard deviation in every dimension of the feature quantity of the expert data that has been extracted, as a standard deviation $s_{exp}^{(n)}$ (expert standard deviation calculating step). In addition, the standard deviation calculation unit 16 calculates a standard deviation in every dimension of the feature quantity of the non-expert data in every dimension that has been extracted, as a standard deviation $s_{base}^{(n)}$ (non-expert standard deviation calculating step).

The standard deviation ratio calculation unit 17 calculates a ratio between the standard deviation $s_{exp}^{(n)}$ and the standard deviation $s_{base}^{(n)}$, as a standard deviation ratio $dfratio^{(n)}$ (standard deviation ratio calculating step). Note that (n) represents a feature quantity number, and $dfratio^{(n)}$ represents a standard deviation ratio of a feature quantity number n.

The feature quantity selection unit 18 selects a predetermined number of ratios in descending order of value from the standard deviation ratio $dfratio^{(n)}$ in every dimension that has been calculated, and selects the feature quantity having a feature quantity number that has been selected, as a feature quantity having a high contribution degree to the desired defect mode that has been initially selected (feature quantity selecting step).

Figure 3:
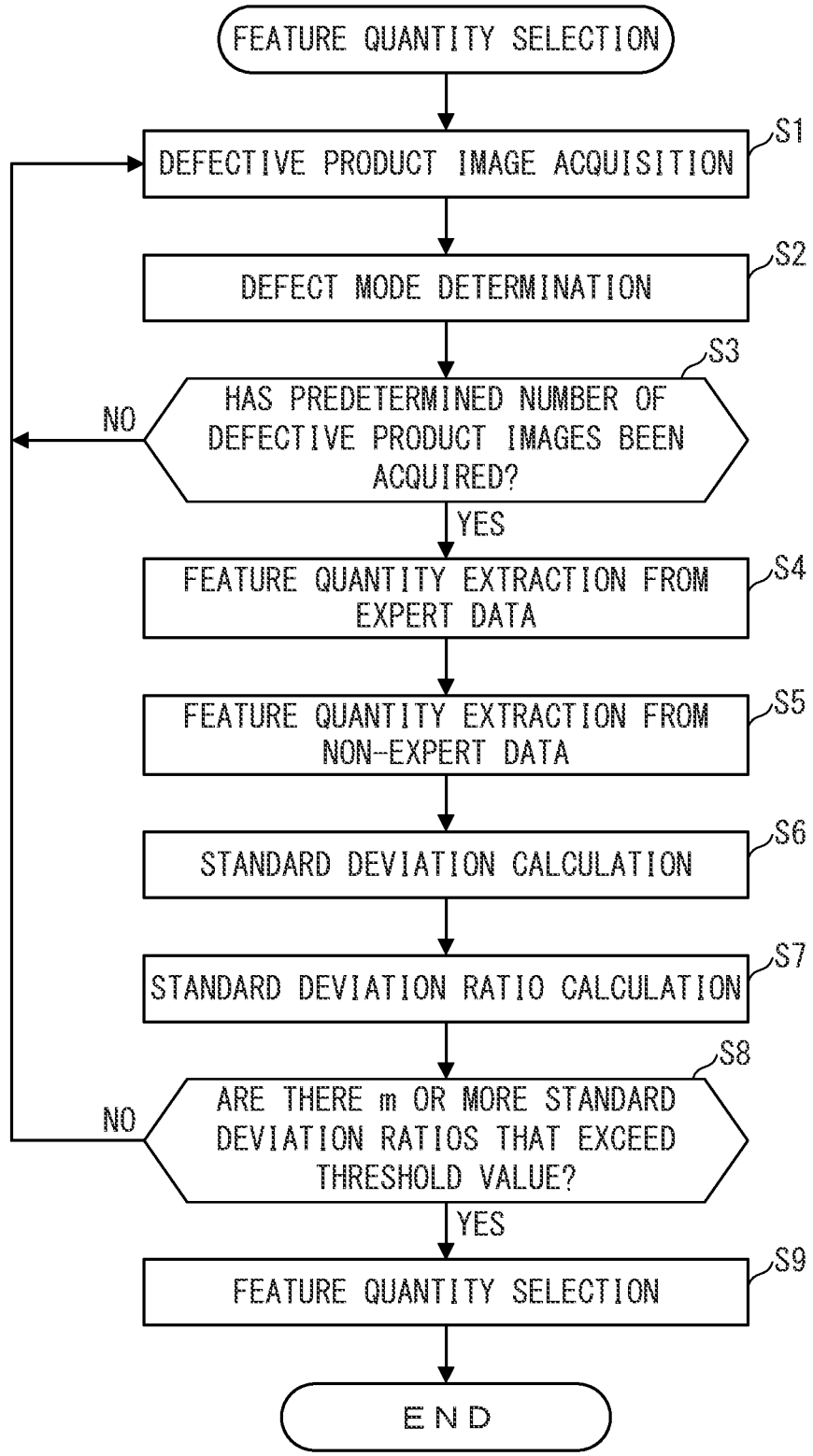
FIG. 3 is a flowchart illustrating feature quantity selection processing by the feature quantity selection device.

FIG. 3 illustrates selection processing of a feature quantity having a high contribution degree in the desired defect mode by the feature quantity selection device 11, which has been described above. In the present processing, first, step 1 (indicated as "S1" in the drawing. Hereinafter, the same will apply), a defective product image is acquired. Here, in a case where the defective product image that has been acquired is selected by a non-expert, such a defective product image is stored, as non-expert data, in the non-expert data storage unit 13. On the other hand, in a case where the defective product image that has been acquired is selected by an expert, the defective product image is stored as expert data, in the expert data storage unit 14.

Regarding which one of the expert or the non-expert has selected the acquired defective product image, it can be configured to make a determination, for example, based on an attribute value of an operator who makes an input when operating the feature quantity selection device 11. Alternatively, it can also be configured to acquire a defective product image to which a label indicating which one of the expert or the non-expert selected has been applied beforehand. In the present embodiment, a few pieces of expert data and a few pieces of non-expert data to be acquired are both sufficient, and thus it is configured to acquire the defective product image to which the label has been applied beforehand.

Next, in step 2, a defect mode that has been selected by the operator of the feature quantity selection device 11 is identified, a defect mode (target defect mode) to be a target for selecting a feature quantity having a high contribution degree in the current processing is determined, and the processing proceeds to step 3.

In step 3, it is determined whether the number of pieces of expert data and the number of pieces of non-expert data, to each of which the label indicating the target defect mode determined in step 2 is applied, respectively have reached predetermined numbers. Such predetermined numbers are respectively set as sufficient numbers of pieces of data for selecting the feature quantity having the high contribution degree to the target defect mode, and can be set to different numbers between the expert data and the non-expert data. In the present embodiment, the necessary number of pieces of expert data is set to, for example, "30", and the necessary number of non-expert data is set to, for example, "200". In a case where a determination result in step 3 is NO, the processing returns to step 1 to acquire a defective product image again. On the other hand, in a case where the determination result of step 3 is YES, the processing proceeds to step 4.

In step 4, expert data to which the label indicating the target defect mode is applied is extracted. From the expert data that has been extracted, a feature quantity of a predetermined dimension number is extracted by use of a known method such as the SIFT or the CNN. Subsequently, in step 5, non-expert data to which the label indicating the target defect mode is applied is extracted. From the non-expert data that has been extracted, a feature quantity of the predetermined dimension number identical to that of the expert data is extracted. Note that in the present embodiment, the predetermined dimension number is 1058, and the feature quantities, to which the feature quantity numbers 1 to 1058 are respectively applied for the sake of convenience, are extracted.

Next, in step 6, a standard deviation in every dimension of the feature quantity of the expert data that has been extracted is calculated as a standard deviation $s_{exp}^{(n)}$, and in addition, the standard deviation in every dimension of the feature quantity of the non-expert data that has been extracted is calculated as a standard deviation $s_{base}^{(n)}$.

Next, in step 7, a ratio between the standard deviation $s_{exp}^{(n)}$ and the standard deviation $s_{base}^{(n)}$ is calculated as a standard deviation ratio dfratio$^{(n)}$ (dfratio$^{(n)}$=$s_{exp}^{(n)}$/$s_{base}^{(n)}$). Specifically, the standard deviation ratio dfratio$^{(n)}$ corresponding to each of the feature quantity numbers 1 to 1058 is calculated.

As described above, in a case where the feature quantity has a small contribution degree in a desired defect mode, the distribution of the feature quantities to be extracted becomes narrow in both the expert data and the non-expert data, and the difference in the standard deviation between them is also small. Therefore, the standard deviation ratio dfratio$^{(n)}$ of the feature quantity also becomes a small value. On the other hand, in a case where the feature quantity has a large contribution degree in the desired defect mode, as to the expert data, the distribution of the feature quantities to be extracted becomes wide and the standard deviation $s_{exp}^{(n)}$ becomes large, whereas as to the non-expert data, the distribution of the feature quantities to be extracted becomes narrow and the standard deviation $s_{base}^{(n)}$ does not become so large. Therefore, the difference in the standard deviation between them becomes large, and thus it is considered that the standard deviation ratio dfratio$^{(n)}$ of the feature quantity becomes a large value. Therefore, it can be considered that as the feature quantity has a larger standard deviation ratio dfratio$^{(n)}$, the contribution degree becomes higher in the target defect mode.

In subsequent step 8, from among the standard deviation ratio dfratio$^{(n)}$ that has been calculated for each dimension, it is determined whether there are a predetermined number m or more ratios that exceed a predetermined threshold value dref. The predetermined number m is the number of feature quantities intended to be selected as a feature quantity having a high contribution degree, and any number can be set. In the present embodiment, the predetermined number m is set to, for example, "5". In addition, in a case where the value of the standard deviation ratio dfratio$^{(n)}$ is equal to or smaller than the threshold value, the threshold value dref is set to a value from which it can be estimated that the contribution degree to the defect mode that has been determined is not sufficiently large. In the present embodiment, the threshold value dref is set to, for example, 0.4.

In a case where a determination result in step 8 is NO and the number of the standard deviation ratios dfratio$^{(n)}$ that exceed the threshold value dref is smaller than the predetermined number m, it is determined that m feature quantities each having a high contribution degree cannot be selected, and the processing returns to step 1 to continue acquiring a defective product image. Note that when the processing returns to step 1, it may be configured so that the value of the predetermined number m is resettable. For example, the predetermined number m can be changed to "4", and it is possible to perform each processing again.

On the other hand, in a case where the determination result in step 8 is YES and there are the predetermined number m or more standard deviation ratios dfratio$^{(n)}$ that exceed the threshold value dref, it is determined that m feature quantities each having a high contribution degree can be selected. The processing proceeds to step 9, and m feature quantities are selected in descending order of value from the standard deviation ratios dfratio$^{(n)}$ of each dimension. The feature quantity associated with such a selected standard deviation ratio dfratio$^{(n)}$ is selected as the feature quantity having the high contribution degree to the target defect mode, and the present processing ends. Note that after the present processing ends, the feature quantity selection device 11 notifies the selected feature quantity number or the like on a display unit, not illustrated, or the like.

FIG. 4 is a graph illustrating an example of the standard deviation ratio that has been calculated for every dimension of the feature quantity. In this example, it is possible to confirm that there are the predetermined number m (set to 5) or more standard deviation ratios dfratio$^{(n)}$ that exceed the threshold value dref (set to 0.4). Therefore, from among the standard deviation ratios dfratio$^{(n)}$ that exceed the threshold value dref, the top five feature quantities are to be selected. In this example in the drawing, the feature quantities having the feature quantity numbers "43", "88", "161", "308", and "349" are selected as the feature quantities each having a high contribution degree to the defect mode that has been determined.

Heretofore, as described in detail, according to the present embodiment, the expert data and the non-expert data to each of which the label indicating a specific defect mode is applied are extracted. The standard deviation $s_{exp}^{(n)}$ in every dimension of the feature quantity of the extracted expert data is calculated, and in addition, the standard deviation $s_{base}^{(n)}$ in every dimension of the feature quantity of the extracted non-expert data is calculated. Furthermore, the standard deviation ratio dfratio$^{(n)}$ of each of them is calculated, and a feature quantity having a large value in the standard deviation ratio dfratio$^{(n)}$ is selected as the feature quantity having the high contribution degree to such a defect mode. Therefore, it is possible to select a feature quantity having a high contribution degree in every defect mode by using minimum expert data and a few pieces of non-expert data.

Note that the present invention is not limited to the above-described embodiments, and can be implemented in various modes. For example, in an embodiment, after the standard deviation ratio dfratio$^{(n)}$ is calculated, the feature quantity having the high contribution degree is selected from among the ratios that exceed the predetermined threshold value dref. However, as a simpler configuration, a feature quantity having a larger value may be selected from among all the standard deviation ratios dfratio$^{(n)}$ without setting the threshold value dref. In addition, the detailed configuration and the like of the feature quantity selection device 11, which have been described in the embodiments are merely examples, and can be appropriately changed within the scope of the gist of the present invention.

What is claimed is:

1. A feature quantity selection method for selecting a feature quantity having a high contribution degree to a specific defect mode, based on expert data and non-expert data, the expert data including images of various defect shapes and being classified in every defect mode indicating a type of a defect, the non-expert data including images of limited defect shapes and being classified in the every defect mode, the feature quantity selection method comprising:
    extracting the expert data corresponding to the specific defect mode, and extracting, by a machine learning network trained on teacher data including the expert data and the non-expert data, a multidimensional feature quantity from the expert data that has been extracted;
    extracting the non-expert data corresponding to the specific defect mode, and extracting, by the trained machine learning network, the multidimensional feature quantity from the non-expert data that has been extracted;
    calculating a standard deviation in every dimension of the feature quantity of the expert data that has been extracted;
    calculating a standard deviation in every dimension of the feature quantity of the non-expert data that has been extracted;
    calculating, as a standard deviation ratio, a ratio between the standard deviation in the every dimension of the feature quantity of the expert data that has been calculated and the standard deviation in the every dimension of the feature quantity of the non-expert data that has been calculated; and
    selecting a predetermined number of standard deviation ratios in descending order of value from among the standard deviation ratios that have been calculated, and selecting feature quantities associated with the standard deviation ratios that have been selected, as the feature quantities each having the high contribution degree to the specific defect mode.

2. The feature quantity selection method according to claim 1, wherein in the selecting, the predetermined number of the standard deviation ratios are selected in the descending order of the value from among the standard deviation ratios that have been calculated and that exceed a predetermined threshold value, and the feature quantities associated with the standard deviation ratios that have been selected are selected as the feature quantities each having the high contribution degree to the specific defect mode.

3. The feature quantity selection method according to claim 1, wherein the defect mode includes at least one of a shrinkage cavity, a scratch, a dent, and a chip residue.

4. The feature quantity selection method according to claim 1, wherein the expert data includes a generated image that has been generated, based on an actual image of a defect shape.

5. A feature quantity selection device that selects a feature quantity having a high contribution degree to a specific defect mode, based on expert data and non-expert data, the expert data including images of various defect shapes and being classified in every defect mode indicating a type of a defect, the non-expert data including images of limited defect shapes and being classified in the every defect mode, wherein
    the feature quantity selection device comprises an information processing device including a computer, the information processing device is configured to:
    extract, by a machine learning network trained on teacher data including the expert data and the non-expert data, the expert data corresponding to the specific defect mode, and to extract a multidimensional feature quantity from the expert data that has been extracted;
    extract, by the trained machine learning network, the non-expert data corresponding to the specific defect mode, and to extract the multidimensional feature quantity from the non-expert data that has been extracted;
    calculate a standard deviation in every dimension of the feature quantity of the expert data that has been extracted;
    calculate a standard deviation in every dimension of the feature quantity of the non-expert data that has been extracted;
    calculate, as a standard deviation ratio, a ratio between the standard deviation in the every dimension of the feature quantity of the expert data that has been calculated and the standard deviation in the every dimension of the feature quantity of the non-expert data that has been calculated; and
    select a predetermined number of standard deviation ratios in descending order of value from among the standard deviation ratios that have been calculated, and to select feature quantities associated with the standard deviation ratios that have been selected, as the feature quantities each having the high contribution degree to the specific defect mode.

6. The feature quantity selection method according to claim 4, wherein the non-expert data and the expert data includes pseudo defective product data that has been generated by use of at least one of a variational auto encoder (VAE) or a generative adversarial network (GAN), based on the actual defective product data.

* * * * *